United States Patent
Rowe et al.

(10) Patent No.: US 11,856,107 B2
(45) Date of Patent: *Dec. 26, 2023

(54) METHODS AND SYSTEMS FOR EXCHANGING CONFIDENTIAL INFORMATION VIA A BLOCKCHAIN

(71) Applicant: CCH INCORPORATED, Riverwoods, IL (US)

(72) Inventors: Cathy Rowe, St. John's (CA); Fabio Bagatin, Varese (IT)

(73) Assignee: CCH INCORPORATED, Riverwoods, IL (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/591,023

(22) Filed: Feb. 2, 2022

(65) Prior Publication Data
US 2022/0158840 A1    May 19, 2022

Related U.S. Application Data

(63) Continuation of application No. 17/085,404, filed on Oct. 30, 2020, now Pat. No. 11,265,169.

(51) Int. Cl.
| | |
|---|---|
| *H04L 29/06* | (2006.01) |
| *H04L 9/32* | (2006.01) |
| *H04L 9/06* | (2006.01) |
| *H04L 9/08* | (2006.01) |
| *H04L 9/30* | (2006.01) |
| *H04L 9/00* | (2022.01) |

(52) U.S. Cl.
CPC .............. *H04L 9/3236* (2013.01); *H04L 9/06* (2013.01); *H04L 9/0825* (2013.01); *H04L 9/0838* (2013.01); *H04L 9/30* (2013.01); *H04L 9/321* (2013.01); *H04L 9/50* (2022.05)

(58) Field of Classification Search
None
See application file for complete search history.

(56) References Cited

U.S. PATENT DOCUMENTS

| | | |
|---|---|---|
| 7,831,488 B2 | 11/2010 | Fox |
| 8,255,304 B1 | 8/2012 | Lorenzo |

(Continued)

FOREIGN PATENT DOCUMENTS

| | | |
|---|---|---|
| CN | 110148048 A | 8/2019 |
| WO | WO-2018044304 A1 | 3/2018 |
| WO | WO-2020160072 A1 | 8/2020 |

OTHER PUBLICATIONS

International Search Report and Written Opinion for Application No. PCT/US2021/048148 dated Dec. 3, 2021.

*Primary Examiner* — Andrew J Steinle
(74) *Attorney, Agent, or Firm* — MARSHALL, GERSTEIN & BORUN LLP

(57) ABSTRACT

A method for supporting verification of information pertaining to a target includes detecting an indication that a request transaction has been received by a smart contract deployed on a blockchain, the request transaction indicating a request to verify information pertaining to the target. The method also includes retrieving the request based on the request transaction. Further, the method includes: generating a reply transaction indicating at least (i) a reply to the request, and (ii) an address, on the blockchain, of an originator of the request; and providing the reply transaction to the smart contract.

20 Claims, 7 Drawing Sheets

(56) References Cited

U.S. PATENT DOCUMENTS

| | | |
|---|---|---|
| 8,543,475 B2 | 9/2013 | Fox |
| 9,338,148 B2 | 5/2016 | Polehn et al. |
| 10,469,248 B2 * | 11/2019 | Chalakudi ............ H04L 63/0435 |
| 2017/0221052 A1 * | 8/2017 | Sheng ..................... H04L 9/14 |
| 2019/0027237 A1 | 1/2019 | McFarlane |
| 2019/0102761 A1 | 4/2019 | Pandian |
| 2019/0147106 A1 | 5/2019 | Androulaki et al. |
| 2019/0266145 A1 | 8/2019 | Qiu et al. |
| 2019/0266146 A1 | 8/2019 | Rose et al. |
| 2019/0303541 A1 | 10/2019 | Reddy et al. |
| 2019/0303942 A1 | 10/2019 | Balaraman et al. |
| 2019/0325436 A1 | 10/2019 | Cheng et al. |
| 2019/0327080 A1 * | 10/2019 | Liu ....................... H04L 9/0891 |
| 2020/0050797 A1 | 2/2020 | Suh |
| 2020/0084027 A1 | 3/2020 | Duchon et al. |
| 2020/0313867 A1 | 10/2020 | Yu |

* cited by examiner

METHODS AND SYSTEMS FOR EXCHANGING CONFIDENTIAL INFORMATION VIA A BLOCKCHAIN

CROSS-REFERENCE TO RELATED APPLICATIONS

This application claims priority to and is a continuation of U.S. application Ser. No. 17/085,404, filed on Oct. 30, 2020, which is incorporated herein by reference in its entirety.

FIELD OF THE DISCLOSURE

The following disclosure generally relates to systems and methods for exchanging confidential information and, more particularly, to automatically confirming confidential information using blockchain technology and smart contracts.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A confirmation process generally involves a confirming entity tasked with determining whether information provided by a target entity is accurate. The confirming entity typically reaches out to a third party to provide evidence regarding the target entity's information. However, such information is often confidential, making it challenging to exchange information among parties, verify the information, and maintain data privacy.

Confirmation processors are traditionally inefficient, manually-performed, and error-prone. Because confirmation processes traditionally require a significant number of messages exchanged between the confirming entity, target, and third party, there are numerous opportunities for fraud, unintentional data exposure, and delays. For example, the messaging between the confirming entity and the third party may unintentionally expose confidential target information to fraudulent actors. Manual entry of target information at the third party may introduce errors. Further, confirmation requests and replies are often exchanged by fax or mail, leading to low response rates and delays.

Some previous confirmation techniques require a central broker through which messages between the confirming entity, target, and third party are exchanged. The central broker, for example, can provide an authorization number to the target, which can then provide the authorization number to the third party to indicate that the target approves of the confirmation process. However, such a central broker does not eliminate data privacy risks, fraud opportunities, or inefficiencies discussed above.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A system of this disclosure implements techniques to automatically and securely verify information pertaining to a target. In particular, a confirmation entity that implements the techniques the techniques of this disclosure can communicate with a third party via a smart contract deployed on a blockchain in order to verify information.

One example embodiment of these techniques is a computer-implemented method for supporting verification of information pertaining to a target. The method can be executed by one or more processors of a computing system and includes: detecting an indication that a request transaction has been received by a smart contract deployed on a blockchain, the request transaction indicating a request to verify information pertaining to the target; retrieving the request based on the request transaction; generating a reply transaction indicating at least (i) a reply to the request, and (ii) an address, on the blockchain, of an originator of the request; and providing the reply transaction to the smart contract.

Another example embodiment of these techniques is a computing system including one or more processors and a non-transitory computer-readable medium. Instructions stored on the computer-readable medium, when executed on the one more processors, cause the system to execute the method outlined above.

In various implementations, the method described above also includes one or more of the following acts or steps. The request may correspond to a confirmation request for an investigation of the target, and the originator may be a user or an entity seeking to verify the information pertaining to the target. The method may include decrypting the request after retrieving the request. Decrypting the request may include using a symmetric encryption key. In some embodiments, the symmetric encryption key may be included in the request transaction, and decrypting the request may include, prior to decrypting the request, decrypting the symmetric encryption key included in the request transaction using a private key. In some embodiments, the method may include encrypting the reply prior to providing the reply transaction to the smart contract. The method may also include validating, using a public key associated with the originator, that the request transaction was signed by the originator. In some embodiments, the method includes requesting, from the target, approval to respond to the request transaction. In some embodiments, the method includes verifying, using a public key associated with the target, that the target provided approval for the request transaction. Further, the method may include retrieving data pertaining to the target and related to the information, calculating a hash value of the data, and including the hash value in the reply.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

DETAILED DESCRIPTION

Using the techniques of this disclosure, a confirmation entity can verify information regarding a target entity by receiving evidence from a third party. The third party, for instance, may maintain information regarding the target entity or on behalf of the target entity. The techniques of this disclosure can be applied in any relevant industry or process in which information needs to be exchanged and/or verified while maintaining the confidentiality of the information. As one example, a confirmation process may involve a financial audit, in which an auditor requests confirmation from a third party, such as a bank or financial institution, regarding information of a client, the audited entity. During an audit, the auditor may seek to confirm information received from the client, such as a bank account balance, by verifying the information with the financial institution where the bank account is held. The auditor also may seek to verify information regarding the client that is held by other companies, which may hold accounts receivable or accounts payable pertaining to the client. Auditors may also use the disclosed techniques to obtain or verify information maintained by other auditors. Similarly, another example confirmation process may be a compliance audit, which may be an external audit performed by an outside confirming entity (e.g., a regulator) or an internal audit performed by entities of the audited company itself. As a further example, the disclosed techniques may be used by medical professionals or insurance providers to exchange and verify patient health information. For instance, a healthcare payer may seek to verify confidential information of a patient that is held by the patient's doctor. Likewise, a first doctor may seek to verify or obtain patient medical records held by a second doctor. Accordingly, the techniques of this disclosure can be applied in any arrangement in which one or more parties seek to verify or confirm information.

Figure 1:
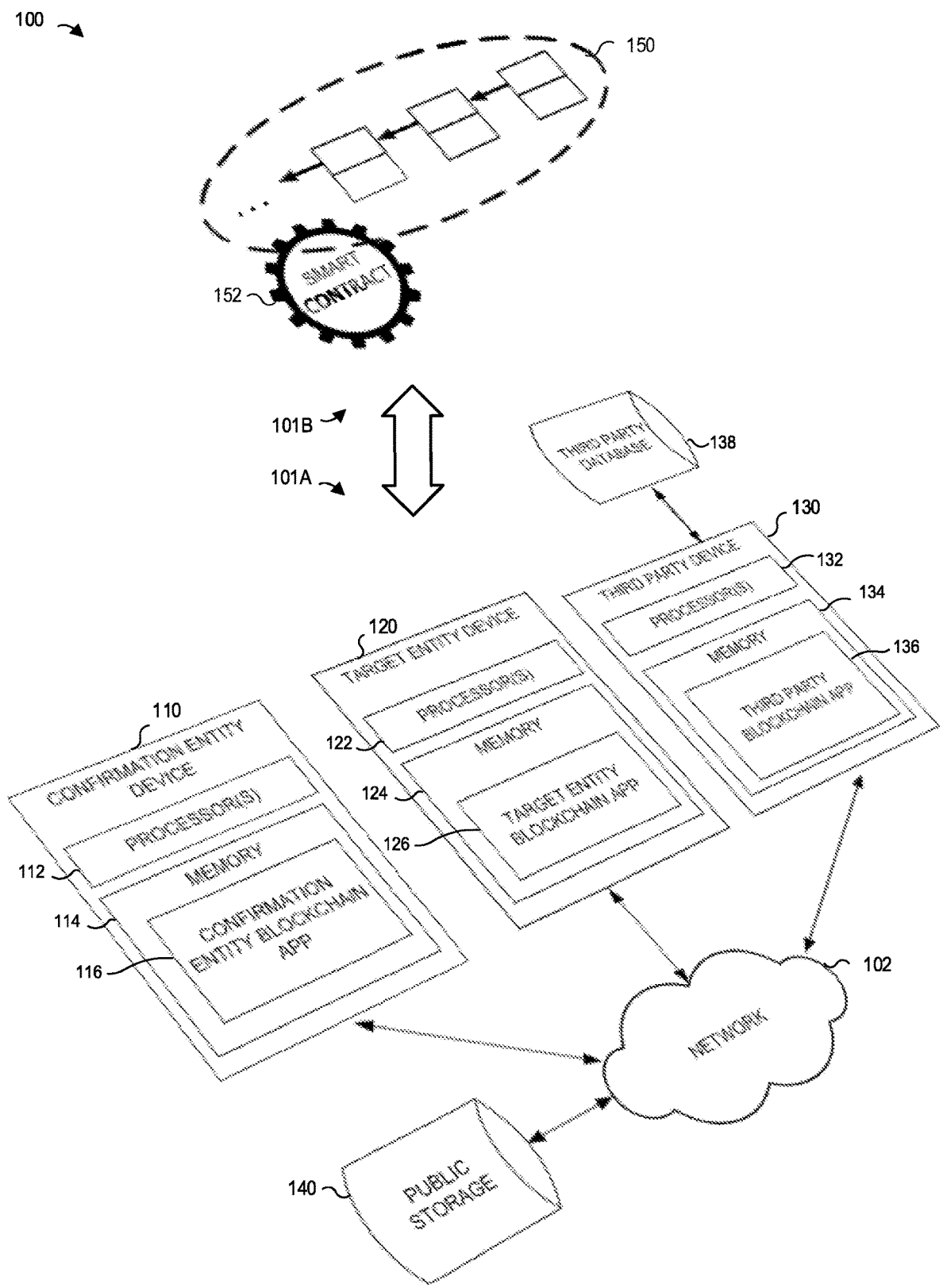
FIG. 1 is a block diagram of a system in which techniques for processing confirmation requests can be implemented.

Further, while for clarity this disclosure may reference "the confirmation entity," "the third party," or "the target entity," as performing certain steps, these steps are generally performed by computing devices associated with these entities and illustrated in FIG. 1, and are not performed by human actors unless explicitly stated.

The computing system of this disclosure utilizes a blockchain in order to exchange information between the parties. It should be also appreciated that while this disclosure primarily refers to a "blockchain," a blockchain is an example type of distributed ledger. A distributed ledger is a storage mechanism for data, events, transactions, etc. that is maintained by several participants. More specifically, a distributed ledger is a way of achieving a distributed consensus on the validity or invalidity of information recorded in the distributed ledger. In other words, the distributed ledger provides a decentralized trust to participants and observers. As opposed to relying on a central authority, a distributed ledger is a decentralized database in which a transactional record of changes to the ledger is maintained and validated by each node of a peer-to-peer network. A blockchain is an example type of distributed ledger, in which groupings of transactions are organized together into a "block" and ordered sequentially (thus the term "blockchain"). Thus, while the distributed ledgers discussed herein are referred to in the context of a blockchain, this is merely one example of a distributed ledger. The techniques of this disclosure could be applied to other types of distributed ledgers besides blockchains.

The nodes that share the ledger may form what is referred to herein as the blockchain network. The nodes in the blockchain network may validate changes to the blockchain (e.g., when a new transaction and/or block is created) according to a set of consensus rules. The consensus rules may depend on the information being tracked by the blockchain, and may include rules regarding the chain itself. For example, a consensus rule may require an originator of a change (e.g., an entity that submits a transaction to the blockchain) to supply a proof-of-identify (e.g., a digital signature), such that only approved entities may originate changes. A consensus rule may require that blocks and transactions adhere to format requirements and supply certain meta information regarding any changes (e.g., blocks must be below a size limit, transactions must include a number of fields, etc.). Consensus rules may include a mechanism to determine the order in which new blocks are added to the chain (e.g., through proof-of-work, proof-of-stake, proof-of-authority, proof-of-space, or other suitable consensus algorithm).

Additions to the blockchain that satisfy the consensus rules may be propagated from nodes that have validated the addition to other nodes that the validating node is aware of. If all the nodes that receive a change to the blockchain validate the new block, then the blockchain may reflect the new change as stored on all nodes, and it may be said that distributed consensus has been reached with respect to the new block and the information contained therein. Any change that does not satisfy the consensus rules may be disregarded by validating nodes that receive the change, which refrain from propagating the change to other nodes. Accordingly, unlike a traditional system which relies on a central authority, a single party cannot unilaterally alter the blockchain unless the single party can do so in a way that satisfies the consensus rules. Further, while nodes may add transactions to the blockchain, past transactions are not erased from the ledger. Accordingly, there remains on the blockchain a verifiable and permanent record of past transactions and the entities that originated past transactions. The inability to modify past transactions leads to blockchains being generally described as trusted, secure, and immutable.

Generally speaking, validation activities of nodes applying consensus rules on a blockchain network may take various forms. In this disclosure, validating nodes may execute code contained in "smart contracts" and distributed consensus may be expressed as the nodes agreeing on the output of the executed code.

A smart contract is a computer protocol that enables the automatic execution and/or enforcement of an agreement between different parties. In particular, the smart contract may be computer code that is located at a particular address on the blockchain and that may be executed by nodes supporting the blockchain. In some cases, the smart contract may run automatically in response to a participant in the blockchain sending funds (e.g., cryptocurrency such as bitcoin, ether, or other digital/virtual currency) and/or data to the address where the smart contract is stored. The smart contract may include one or more trigger conditions that, when satisfied, correspond to one or more actions. For some smart contracts, which action(s) from the one or more actions are performed may be determined based upon one or more decision conditions. In some instances, data streams may be routed to the smart contract so that the smart contract may detect that a trigger condition has occurred, and/or analyze a decision condition.

For example, a smart contract may define a collection of variables, where the values of the variables are referred to as the "state" of the smart contract. The values are stored in a state database of the blockchain. Each node may maintain a copy of the state database, which reflects current values of the variables, i.e., the current state of the smart contract. Transactions may include updates to the current values. Accordingly, when a transaction that affects the variables is validated and added in a block to the blockchain, the nodes can make any updates to the state database in accordance with the transaction. Such updates cause the state of the smart contract to change, and trigger events in accordance with the smart contract program code.

In addition to blockchains and smart contracts, this disclosure also leverages hashing to verify confidential information. Hashing refers to applying a cryptographic hash function, such as a Standard Hash Algorithm (SHA), to an input to calculate a hash value (also referred to herein as a "hash") of the input. The cryptographic hash function maps the input, which can be of an arbitrary size, to a hash of a fixed size. Cryptographic hash functions are deterministic, meaning that hashing the same input results in the same hash. In addition, different inputs result in different hashes. However, the hashing process cannot be reversed. Thus, two hashes can be compared to determine whether the hashes correspond to the same inputs, but a hash itself cannot be reverse-engineered to determine the original input.

Turning to this disclosure, in an example method, a confirmation entity device can generate a request for a third party to confirm data associated with a target entity. The request, for example, can include the information that the confirming entity device aims to verify or a cryptographically-generated hash of the information, or can include a query for particular information. To ensure that the request is handled securely, the confirming entity device encrypts the request. For example, the confirming entity device can encrypt the request using a randomly-generated symmetric key, or using a public key of a known party to which the request is directed. The confirming entity device also may store the encrypted request in a location where the third party can later retrieve the encrypted request.

To trigger other entities, such as the third party or the target, to process the request, the confirming entity device can provide a transaction (i.e., a request transaction) to a smart contract deployed on a blockchain. The request transaction may include an indication of the request (e.g., a hash of the request or a location of the encrypted request) and a blockchain address of the third party to which the request is directed. In implementations where the target entity has a blockchain address, the request transaction may also include the blockchain address of the target entity. In implementations in which the request is encrypted using a symmetric key, the transaction request can include the symmetric key encrypted using a public key of the third party. Further, the confirming entity can sign the transaction request using a private key of the confirming entity.

If the nodes supporting the blockchain validate the request transaction (e.g., by ensuring that the request transaction satisfies consensus rules), the nodes can include the request transaction in a block of the blockchain. Inclusion in the blockchain of a transaction sending data to the smart contract may cause the nodes to update a state of the smart contract, which in turn triggers events in accordance with the smart contract.

In particular, the validated request transaction triggers the smart contract to generate an event that notifies the third party and/or the target, depending on the implementation. For instance, in implementations where the transaction request includes a blockchain address of the target entity, the smart contract generates an event to notify the target entity. The target entity can then approve the request, causing the smart contract to generate an event for the third-party application. In implementations where the transaction request does not include a blockchain address of the target entity, the smart contract can generate an event for the third-party application.

In response to detecting the event, the third-party application can either verify that the target entity approved the request, or can request approval for the request from the target entity. The third-party application can also validate that the requestor is actually the confirmation entity device (e.g., by verifying that the transaction request was signed by the confirmation entity device). The third-party application can retrieve the encrypted request, decrypt the request using a private key of the third-party application, and generate a reply to the request. Similarly to how the confirmation entity device generates the request transaction, the third-party application can generate a reply transaction and submit the reply transaction to the smart contract. In particular, depending on the query, the reply transaction may include a hash of the reply, rather than the reply itself. For example, if the request is for confidential information, the reply transaction can include a hash of the confidential information. Accordingly, the disclosed techniques do not require confidential information to be transmitted between entities.

The confirmation entity application can detect an event generated by the smart contract indicating the transaction reply, retrieve the transaction reply, use the information in the transaction reply to decrypt the reply. The confirmation entity application can then analyze the reply to determine whether the third party validated the information in the request or provided the requested information. To analyze the reply, the confirmation entity application can compare a hash of the information available to the confirmation entity (e.g., the information that the target entity furnished to the confirmation entity) to a hash in the reply. If the hashes are identical, then the confirmation entity application can verify that the information at the confirmation entity matches the information of the third party.

By utilizing a blockchain and smart contract executing on the blockchain to process a confirmation, the system may provide a trusted, secure, and immutable record of the information flow between the parties of the confirmation. As discussed above, past transactions stored on the blockchain cannot be subsequently altered, and no single party can unilaterally add to the blockchain unless the addition is validated in accordance with consensus rules.

Moreover, the system improves fraud detection through the use of cryptography to prove the identity of any entity that submits a transaction to the blockchain. An entity generating a transaction signs the transaction with a cryptographic signature unique to the entity (e.g., a private key of the entity), which other entities can verify (e.g., using a public key of the entity) to determine that the entity is the originator of the transaction. If a transaction is not signed or the signature does not correspond to a signature of a trusted entity, other entities can discard the transaction. Similarly, the system enables different entities to exchange data in a secure manner. By encrypting data using cryptographic algorithms (e.g., symmetric keys, public/private keys), the entities can ensure that only designated recipients can access the data.

Importantly, the disclosed systems do not require entities to exchange confidential information. Instead of confidential information, requests and replies can include hashes of the confidential information or a token computed using a Zero Knowledge Proof (ZKP) algorithm. For example, in a scenario involving an audit, the request may include a hash or a ZKP token of a bank account balance and ask a bank (i.e., the third party) whether the bank agrees with the bank account balance. The bank can retrieve the bank account balance in the bank's records, calculate a hash or a ZKP token of the retrieved bank account balance, and compare the provided hash or ZKP Token in the request to the calculated value. If the values (hashes or tokens) are identical, then the bank account balance in the auditor's records is identical to the balance in the bank's records. Accordingly, the bank can indicate in the reply whether the bank account balance in the request matched with the bank's records. As a second example, the request may ask for a bank account balance. The bank can reply with a hash or a ZKP token of the bank account balance in the bank's records. The auditor calculates a hash or ZKP token of the bank account balance provided to the auditor by the target, and compares this hash or ZKP token to the value in the reply. If the values match, then the auditor can determine that the balance provided by the target matches the balance in the bank's records. In these examples, the auditor can verify the bank account balance without the actual balance being exchanged between the auditor and the bank. Thus, the disclosed techniques reduce opportunities for data exposure.

Additionally, in contrast to traditional confirmation methods, there is no central broker serving as an intermediary between the various entities (e.g., the confirmation entity, the target entity, and the third party). Accordingly, the disclosed system reduces the risk of fraud and other errors by eliminating the single point of failure present in a centralized system. Rather than relying on a central broker, the disclosed system utilizes encryption and hashing techniques to ensure the confidentiality of data.

Furthermore, by using blockchains and smart contracts, many of the manual tasks associated with the confirmation process can be automatically performed or eliminated. For example, conventionally, an employee of a third party receives confirmation requests from a confirmation entity, locates the relevant information, transcribes the information into a reply to the confirmation, and sends the reply to the confirmation entity. The confirmation entity may need to send reminders to the third party to check on the status of the reply. In contrast, using the techniques of this disclosure, a smart contract can prompt a blockchain oracle to automatically retrieve relevant information directly from third party computing systems without manual intervention, hash the information to ensure data privacy, and provide a reply to the smart contract. The smart contract can then automatically notify the confirmation entity of the reply. As another example, the target may need to provide approval for the third party to release information relating to the target. For example, in the case of confidential medical information, the patient may need to provide approval for a medical professional to release or to confirm the information with another party. Using the techniques of this disclosure, a smart contract can directly notify the target of a confirmation request, the target can sign the confirmation request to indicate approval, and the smart contract can automatically route the signed confirmation request to the third party, without any time-consuming back-and-forth messaging. Further, all requests and replies are encrypted, and any confidential information may be shared in the form of non-reversible hashes. Accordingly, the disclosed systems and methods improve the efficiency of the confirmation process while also improving data security, accuracy, and fraud protections.

Turning to the Figures, FIG. 1 illustrates an example computing system 100 in which the confirmation processing techniques of this disclosure can be implemented. The computing system 100 includes a hardware domain 101A and a software domain 101B. The software domain 101B includes a blockchain 150 and a smart contract 152 implemented by the physical computing devices of the hardware domain 101A.

The hardware domain 101A includes a confirmation entity device 110 that is associated with a confirmation entity, a target entity device 120 that is associated with a target entity, and a third party device 130 that is associated with a third party. The confirmation entity device 110, target entity device 120, and third party device 130 may be communicatively coupled via a network 102. The network 102 in general can include one or more wired and/or wireless communication links and may include, for example, a wide area network (WAN) such as the Internet, a local area network (LAN), a cellular telephone network, or another suitable type of network. The confirmation entity device 110, target entity device 120, and the third party device 130 may interact via the network 102 with a blockchain 150 maintained by a plurality of nodes.

Each of the confirmation entity device 110, the target entity device 120, and the third party device 130 may be a server, a desktop computer, a laptop computer, a portable computing device, or any other suitable type of computing device. It should be appreciated that while FIG. 1 illustrates each of the computing devices 110, 120, and 130 as a singular device, in other embodiments, each computing device may include multiple computing devices.

The confirmation entity device 110 includes one or more processor(s) 112 and a memory 114. The one or more processor(s) 112 can include one or more general-purpose processors (e.g., central processing units (CPUs)) or special-purpose processing units capable of executing machine-readable instructions stored on the memory 114. The memory 114 may be a non-transitory memory and may include one or several suitable memory modules, such as random access memory (RAM), read-only memory (ROM), flash memory, other types of persistent memory, etc. In addition, the confirmation entity device 110 may include components not shown in FIG. 1, such as a display, a user interface, an input/output (I/O) interface, an operating system (OS), and/or one or more communication interfaces such as hardware, software, and/or firmware enabling communications via the network 102.

The confirmation entity device 110 implements a confirmation entity blockchain application 116, which may be stored as executable instructions on the memory 114. The confirmation entity blockchain application 116 enables the confirmation entity device 110 to interact with the blockchain 150. For example, the confirmation entity blockchain application 116 may include application programing interfaces (APIs) that can query blockchain nodes, transmit data from the confirmation entity device 110 to blockchain nodes (e.g., to provide or submit a transaction to the blockchain), monitor the blockchain (e.g., by monitoring for events generated by a smart contract that contain the blockchain address of the confirmation entity blockchain application 116), and otherwise exchange information with blockchain nodes and the confirmation entity device 110. Accordingly, the confirmation entity blockchain application 116 implements the functionality of a so-called "blockchain oracle."

It is noted that although FIG. 1 illustrates the confirmation entity blockchain application 116 as a standalone application stored on the memory 114, the functionality of the confirmation entity blockchain application can also be provided in the form of an online service accessible via a web browser executing on the confirmation entity device 110, as a plug-in or extension for another software application executing on the confirmation entity device 110, etc. The confirmation entity blockchain application 116 may be a distributed application (DApp) with backend functions implemented by the blockchain nodes.

The target entity device 120 includes one or more processors 122 and a memory 124, which may be similar to the processor(s) 112 and the memory 114. Likewise, the target entity device 120 also implements a target entity blockchain application 126 that enables the target entity device 120 to interact with the blockchain 150, similar to the confirmation entity blockchain application 116.

The third party device 130 also includes one or more processors 132 and a memory 134, which may be similar to the processor(s) 112 and the memory 114. In addition, the third party device 130 implements a third party blockchain application 136 that enables the third party device 130 to interact with the blockchain 150 similar to the confirmation entity blockchain application 116. The third party device 130 can be communicatively coupled to a third party database 138 that stores data maintained by the third party. The data stored in the third party database 138 may include information relating to the target entity. For example, if the third party is a medical provider, the third party database may include patient information. If the third party is a company, the third party database may include customer records, accounting records, regulatory compliance records, etc. If the third party is a bank, the third party database may include customer account information, including information regarding a client that is subject to an audit. The third party database 138 may utilize any known database architecture, and may include multiple databases.

Further, each of the confirmation entity device 110, the target entity device 120, and the third party device 130 may access a public storage system 140. The public storage system 140 may have a distributed architecture (e.g., multiple servers interconnected via a communication network, such as the network 102). For example, the public storage system 140 may function in accordance with the InterPlanetary File System (IPFS) protocol. The public storage system 140 is publicly accessible such that all interested parties (e.g., the confirmation entity device 110, the target entity device 120, the third party device 130, and other entities not depicted in FIG. 1) may access the public storage system 140 without private login information. Different locations within the public storage system 140 may be defined by unique addresses.

The hardware domain 101A components of the computing system 100 can access, via the network 102, the blockchain 150 maintained by a plurality of nodes. The confirmation entity device 110, the target entity device 120, and/or the third party device 130 may serve as one of the nodes that supports the blockchain 150. Further, other computing devices not shown in FIG. 1 can also make up the plurality of nodes.

In some implementations, the blockchain 150 may be a public blockchain, meaning that any party may view the shared ledger, submit new information to be added to the ledger, and/or join the network as a validating node. In other implementations, the blockchain 150 may be a private blockchain (e.g., a permissioned ledger) that keeps chain data private among a group of entities authorized to participate in the blockchain network (e.g., the confirming entity, the target entity, and the third party). In still other implementations, the blockchain 150 may be both permissioned and permissionless whereby participants may need to be validated, but only the information that participants in the network wish to be public is made public.

While not shown in FIG. 1 to avoid clutter, each node may include at least one processor, a memory, a communication interface, an I/O interface, one or more applications, an OS, and a blockchain manager. Each node maintains a copy of the blockchain (i.e., the distributed ledger). As changes are made to the blockchain, each node receives the change (e.g., via the network 102) and updates its respective copy of the blockchain. The nodes may use a consensus mechanism to determine whether it is appropriate to make any received changes to the blockchain. Each node therefore has its own copy of the blockchain that is identical to every other copy of the blockchain stored by the other nodes. As a result, the decentralized blockchain network is more robust than a central authority database system, in which there is a single point of failure.

Each node may generate a new block of transactions, or may broadcast transactions to other network nodes using the blockchain manager. Similarly, the node may use the blockchain manager in connection with smart contracts stored in the memory of the node to execute the functionality disclosed herein. The memory of the node may further include chain data including, for example, a state database of the blockchain for storing states of smart contracts deployed thereon, such as a smart contract 152.

The smart contract 152 is deployed on the blockchain 150 and can be invoked by the components of the computing system 100 to implement the techniques of this disclosure. The nodes of the blockchain 150 can execute the code contained in the smart contract 152 and can each store a copy of the state database for the smart contract 152. In response to validating transactions submitted to the smart contract 152, the nodes can update the state of the smart contract 152, thereby triggering events in accordance with the terms of the smart contract 152.

Figure 2:
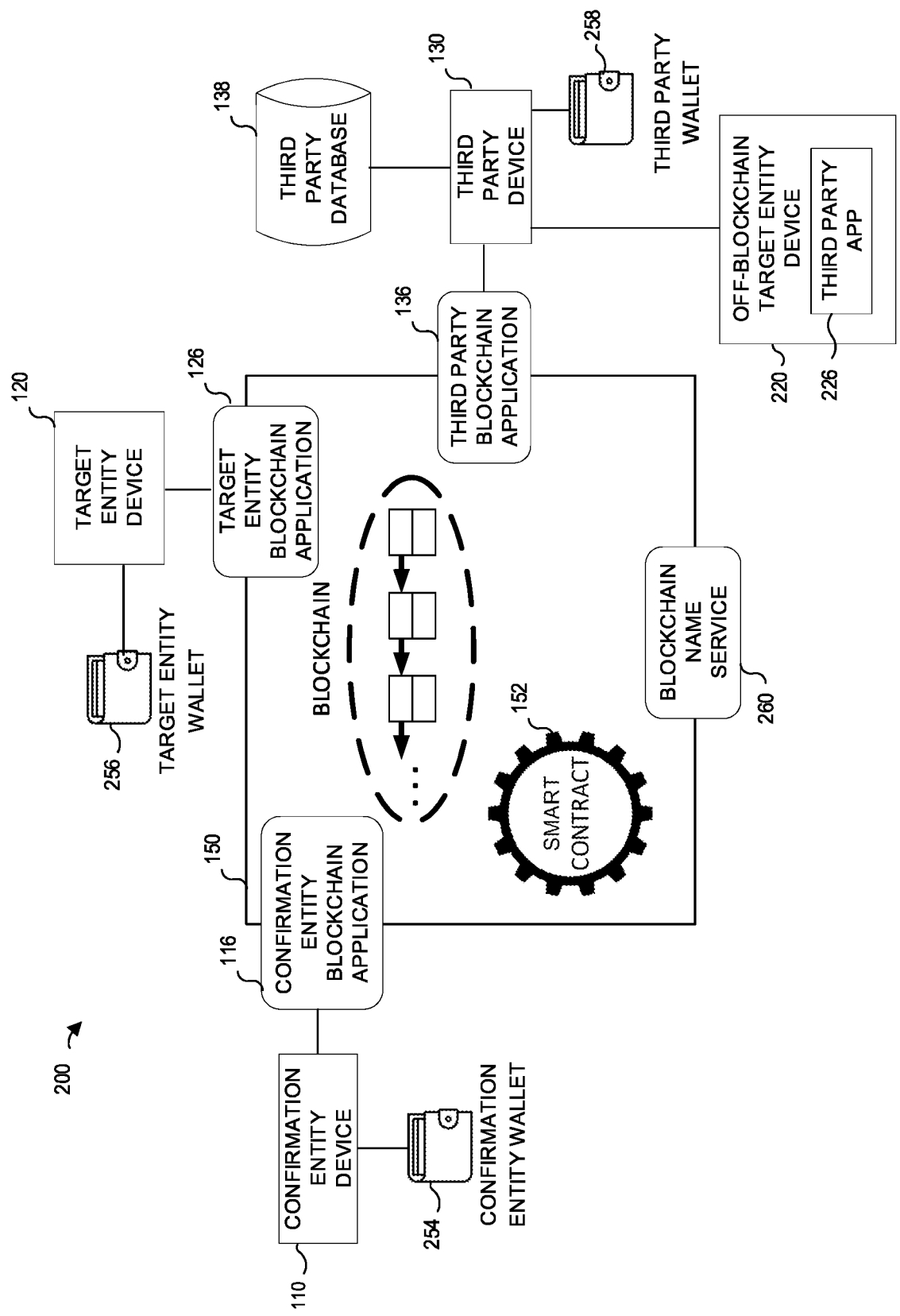
FIG. 2 is a block diagram that illustrates how the devices of FIG. 1 may interact with a blockchain.

Turning to FIG. 2, a block diagram of the example computing environment 200 illustrates how components of the computing system 100 interact with the blockchain 150. The confirmation entity device 110 is coupled to a confirmation entity wallet 254. The confirmation entity wallet 254 is an electronic wallet that stores cryptographic keys associated with confirmation entity. In particular, the confirmation entity wallet 254 may store pairs of public and private cryptographic keys that are used for encryption and decryption. The confirmation entity wallet 254 can be software included within the confirmation entity device 110 or accessible from the confirmation entity device 110. In some implementations, the confirmation entity wallet is a hardware wallet that can be coupled to the confirmation entity device 110. Likewise, the target entity device 120 is also coupled to a target entity wallet 256, and the third party device is coupled to a third-party wallet 258.

The confirmation entity device 110 can interact with the blockchain 150 by implementing the confirmation entity blockchain application 116. For example, the confirmation entity blockchain application 116 can broadcast transactions to the smart contract 152 deployed on the blockchain 150. The confirmation entity blockchain application 116 can digitally sign transactions using a private key associated with the confirmation entity and stored in the confirmation entity wallet 254. Other nodes and/or entities can verify that the source of the transaction is the confirmation entity by attempting to decrypt the digital signature using a public key associated with the confirmation entity. If another node is unable to decrypt the digital signature, the node can detect the transaction request as a spoofing attempt. Otherwise, the node can detect that the transaction request indeed originated from the indicated source.

The confirmation entity blockchain application 116 can also encrypt data that is stored or broadcast to the blockchain using a public key of a particular entity. Only an entity with access to the particular entity's private key (i.e., only the particular entity, provided the particular entity's private key is secure) will be able to decrypt the data. Accordingly, the confirmation entity blockchain application 116 can also use a private key of the confirmation entity to decrypt data that was encrypted using a public key of the confirmation entity.

To identify a public key of an entity, the nodes of the blockchain 150 and the other components of the computing environment 200 can access a blockchain name service 260, which is a directory or database that stores public keys.

Additionally, the confirmation entity blockchain application 116 can monitor the blockchain 150 to detect events generated by the smart contract 152 (e.g., in response to an update to the state of the smart contract 152). The components of the computing environment 200 (e.g., the confirmation entity blockchain application 116, the target entity blockchain application 126, and the third party blockchain application 136, the nodes of the blockchain 150, the smart contract 152) are each associated with a blockchain address. The confirmation entity blockchain application 116 can direct transactions to the smart contract 152 by identifying the smart contract 152 using the smart contract address, and can similarly include the blockchain addresses of the target entity blockchain application 126 and/or the third party blockchain application 136 in the transactions. Further, the confirmation entity blockchain application 116 can detect when the smart contract 152 generates an event containing the blockchain address of the confirmation entity blockchain application 116.

The target entity blockchain application 126 and the third party blockchain application 136 can implement analogous functionality to the confirmation entity blockchain application 116. Additionally, the third party device 130 may be communicatively coupled to an off-blockchain target entity device 220. The off-blockchain target entity device 220 is associated with the target entity and may be similar to the target entity device 120. However, the off-blockchain target entity device 220 does not interact directly with the blockchain 150. The off-blockchain target entity device 200 implement a third-party application 226 associated with the third party. For example, if the third party is a company, the third party application 226 may be an application that enables customers to manage their accounts with the company. If the third party is a bank, the third-party application 226 may be an online banking platform or other application that allows the target entity device 220 to access accounts of the target entity that are managed by the bank. If the third party is a medical provider, the third party application 226 may be an e-health platform that allows the patient to securely view and manage their health records.

Whether the target entity utilizes the target entity device 120 or the off-blockchain target entity device 220 can vary by implementation. In some implementations, the target entity utilizes the target entity device 120. As a result, the other entities can communicate directly with the target entity device 120 via the blockchain 150 and the smart contract 152. In other implementations, the target entity utilizes the off-blockchain target entity device 220. In such implementations, other entities, such as the confirmation entity, can interact with the off-blockchain target entity device 220 through transactions directed to the third party blockchain application 136. The third party device 130 can then exchange messages with the target entity via the off-blockchain target entity device 220.

Figure 3A:
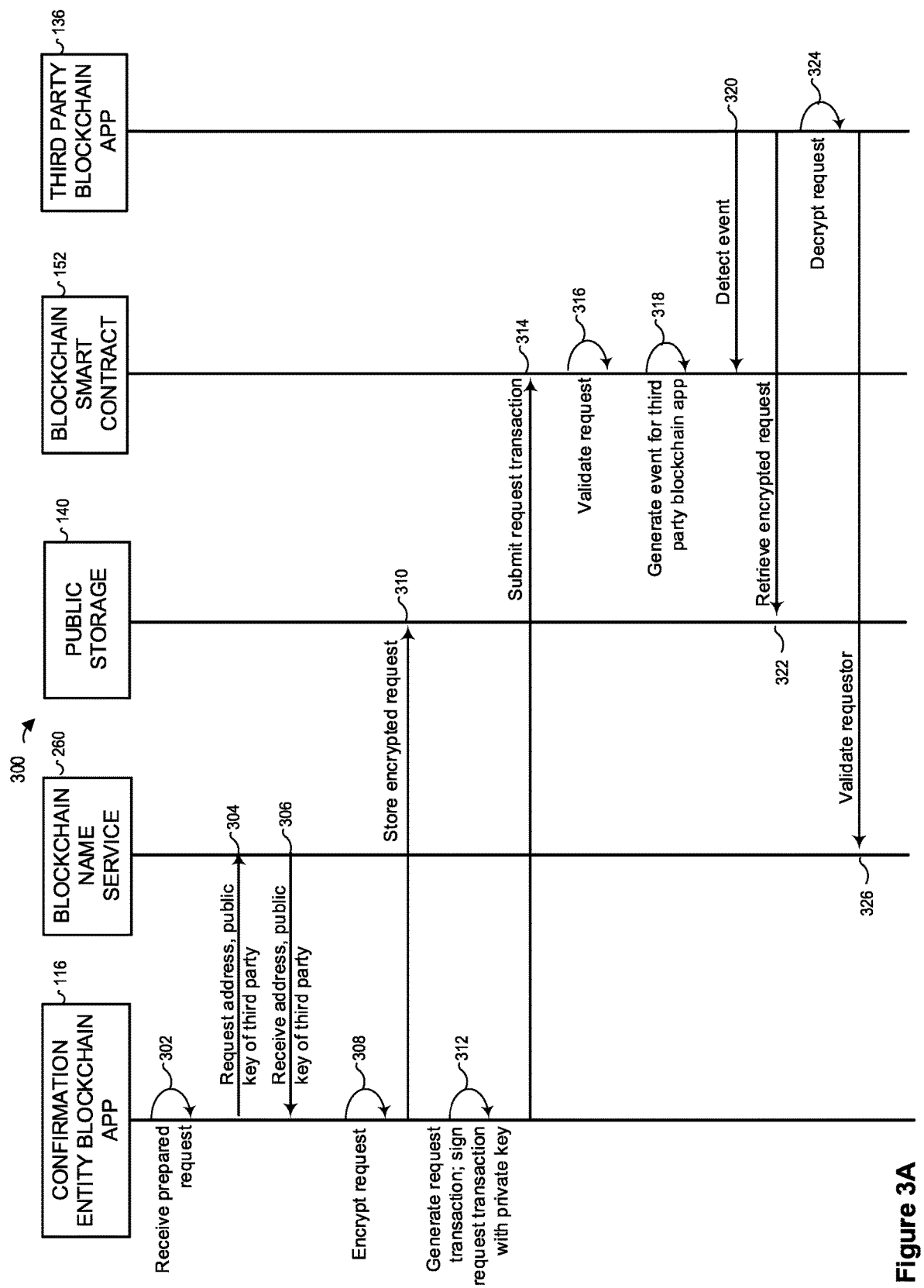
FIGS. 3A-3B are messaging diagrams of an example scenario in which a confirmation involving a target entity that does not access the blockchain is processed in accordance with the disclosed techniques.
Figure 3B:
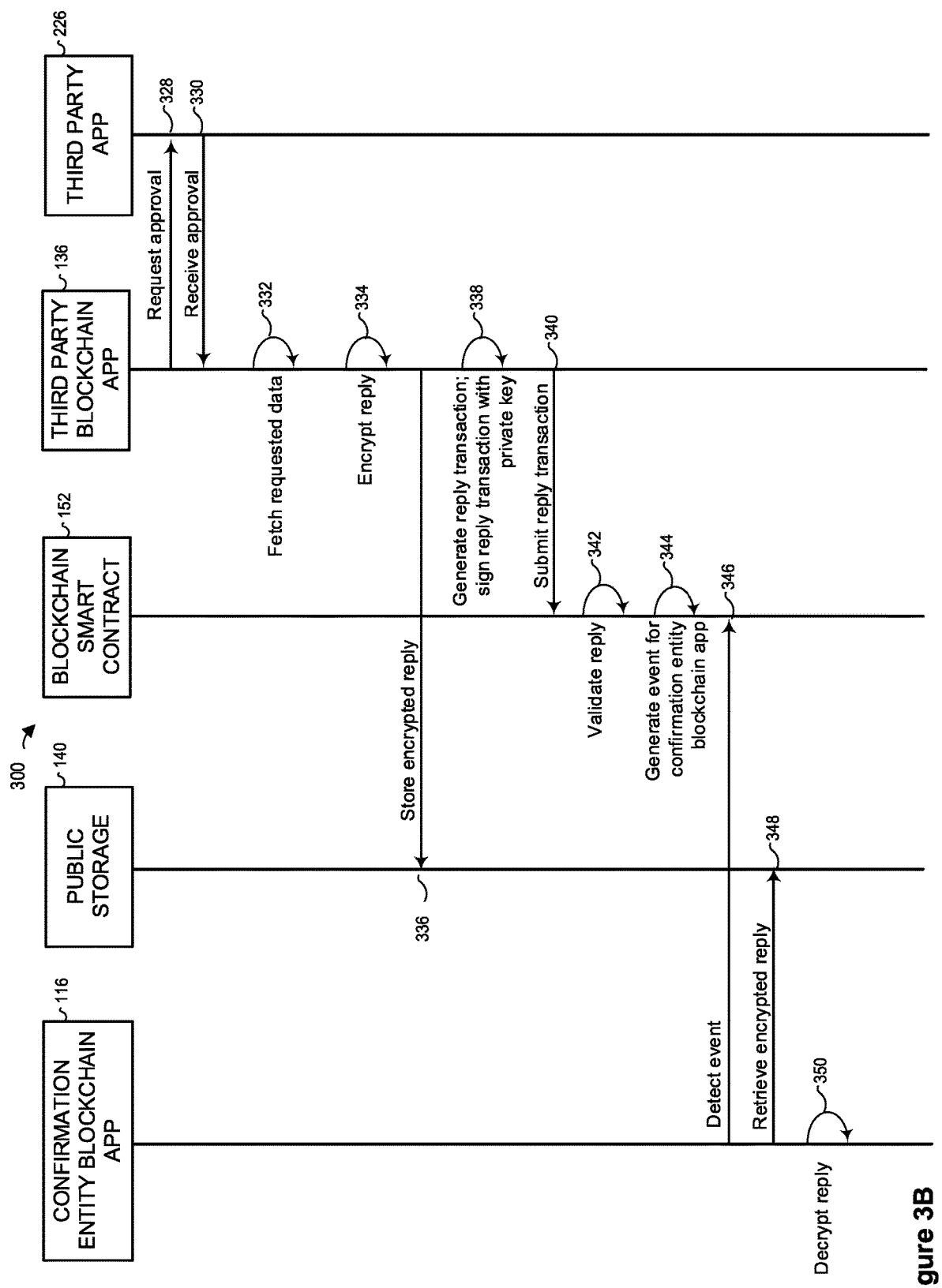

FIGS. 3A-3B illustrate an example scenario 300 for processing a confirmation involving a target entity that does not access the blockchain 150. Initially, the confirmation entity blockchain application 116 receives 302 a prepared request. A user, such as an auditor, associated with the confirmation entity can utilize the confirmation entity device 110 to prepare the request and submit the request to the confirmation entity blockchain application 116. In some implementations, the user prepares the request using the confirmation entity blockchain application 116. In other implementations, the user prepares the request using a different application that submits the prepared request to the confirmation entity blockchain application 116 for processing. In yet other implementations, the confirmation entity blockchain application 116 (or another application associated with the confirmation entity) may automatically generate the request in accordance with an ongoing audit. The confirmation entity blockchain application 116 may need to format the prepared request prior to sharing or storing the request. For example, if the prepared request includes confidential information that is not in a hashed format, the confirmation entity application 116 can calculate a hash of the confidential information and include only the hash in the request. While this disclosure primarily refers to examples hashes of confidential information, as discussed above, in some implementations, the entities may calculate, exchange, and compare ZKP tokens rather than hashes.

The request identifies the target entity that the confirmation entity seeks to investigate. Additionally, the request identifies the third party that can provide evidence regarding the target entity. For instance, the third party may be an entity that maintains information of the target entity. The request may take different forms depending on the implementation. In some implementations, the request indicates information that the confirmation entity would like to confirm with the third party. For example, the information may be a statement or a record of the target that the confirming entity would like to verify. In some implementations, the request may include the information. However, in other, preferred embodiments, to prevent sharing of confidential information, the request includes a hash of the information rather than the information itself. The request may ask the third party whether the third party agrees with the information included in the request (i.e., whether, if the third party calculates a hash of information in the third party's records, the third party's calculated hash matches with the hash in the request). Additionally or alternatively, the request may ask the third party to furnish information or provide other evidence. The request may indicate that any confidential information should be provided in a hashed format. As will be discussed in further detail below, the third party blockchain application 136 can automatically retrieve information related to the request, verify information in the request, and transmit replies to received requests without manual intervention.

Next, the confirmation entity blockchain application 116 identifies the third party based on the information in the request. The confirmation entity blockchain application 116 requests 304 a blockchain address and public key of the third party blockchain application 136 from the blockchain name service 260 and receives 306 the blockchain address and public key from the blockchain name service 260 in response. If the confirmation entity blockchain application 116 is already aware of the blockchain address or the public key (e.g., because the memory 114 already stores the blockchain address or public key), then the confirmation entity blockchain application 116 can omit the steps 304-306.

The confirmation entity blockchain application 116 encrypts 308 the request using a cryptographic algorithm. In some implementations, the confirmation entity blockchain application 116 encrypts the request using a symmetric key, which the confirmation entity blockchain application 116 may randomly generate using a random number generator (RNG) or other suitable cryptographic key generator. In other implementations, the confirmation entity blockchain application 116 encrypts the request using a public key of the third party blockchain application 136. The confirmation entity blockchain application 116 may also calculate a hash of the encrypted request.

In some implementations, the confirmation entity blockchain application 116 can then store 310 the encrypted request in the public storage system 140 accessible by the third party blockchain application 136. In other implementations, the confirmation entity blockchain application 116 refrains from storing the encrypted request in the public storage system 140, and can instead include the encrypted request in the request transaction that the confirmation entity blockchain application 116 generates at event 312 (introduced below).

Next, the confirmation entity blockchain application 116 generates 312 a request transaction (i.e., a transaction to submit to the blockchain 150 associated with the request). The request transaction includes an indication of a location of the encrypted request (e.g., a location of the encrypted request stored in the public storage system 140). The request transaction may also include the hash of the encrypted request. Additionally or alternatively, the confirmation entity application 116 may include the encrypted request in the request transaction (e.g., in implementations where the confirmation entity blockchain application 116 does not store 310 the encrypted request in the public storage system 140). Further, the request transaction includes the blockchain address of the third party blockchain application 136. In addition, the request transaction may include a mechanism by which to decrypt the encrypted request. For example, if the confirmation entity blockchain application 116 encrypted the request using a symmetric key, the confirmation entity blockchain application 116 may encrypt the symmetric key using the public key of the third party blockchain application 136 and include the encrypted symmetric key in the transaction request.

The confirmation entity blockchain application 116 also signs 312 the request transaction with a private key associated with the confirmation entity. The confirmation entity blockchain application 116 may automatically sign the request transaction, or may prompt a user of the confirmation entity blockchain application to sign the request.

Next, the confirmation entity blockchain application 116 submits 314 the request transaction to the smart contract 152 deployed on the blockchain 150. In some implementations, the confirmation entity blockchain application 116 generates and deploys the smart contract to the blockchain, either before or upon generating the request transaction. In such implementations, each confirmation process may be associated with its own smart contract. In other implementations, another application may generate and deploy the smart contract. To submit 314 the request, the confirmation entity blockchain application 116 may send the request transaction to the blockchain address of the smart contract 152. The nodes of the blockchain 150 independently process the request transaction using the executable program in the smart contract 152 to validate 316 the request transaction. Validating the request transaction may include determining that the request transaction satisfies the consensus rules of the blockchain 150. For example, validating the request transaction may include determining that the request transaction originated from an authorized source. If the nodes validate 316 the request transaction, the request transaction is included in a block that is added to the blockchain 150. Inclusion of the request transaction in the blockchain 150 causes an update to the state of the smart contract 152, which triggers a response in accordance with the terms of the smart contract 152.

In response to validating 316 the request transaction, the smart contract 152 generates 318 an event including the blockchain address of the third party blockchain application 136. This can also be referred to as the smart contract 152 "emitting" an event. The event notifies the third party blockchain application 136 of the existence of the new request transaction addressed to the third party blockchain application 136. Accordingly, the third party blockchain application 136 detects 320 the event and retrieves the request transaction from the blockchain 150.

The third party blockchain application 136 uses the information in the request transaction to retrieve 322 the encrypted request. In particular, the third party blockchain application 136 can determine the location of the encrypted request based on the request transaction (e.g., the location in the public storage system 140, if the encrypted request is not included in the request transaction). If the request transaction includes the symmetric key encrypted by the public key of the third party blockchain application 136, the third party blockchain application 136 decrypts the symmetric key using the private key of the third party blockchain application 136. Further, the third party blockchain application 136 can calculate a hash of the stored encrypted request and compare the calculated hash to a hash included in the request transaction to verify that the stored encrypted request has not been altered.

The third party blockchain application 136 then decrypts 324 the encrypted request. In some embodiments, the third party blockchain application 136 decrypts 324 the encrypted request using the symmetric key. In other embodiments, the third party blockchain application 136 can decrypt 324 the encrypted request using the private key of the third party blockchain application 136.

Additionally, the third party blockchain application 136 can verify 326 the originator of the request transaction. After retrieving the public key of the confirmation entity blockchain application 116 (e.g., from the blockchain name service 260), the third party blockchain application 136 can decrypt the signature included the request transaction to validate that the request transaction was signed with the private key of the confirmation entity blockchain 116.

Turning to FIG. 3B, after decrypting 324 the request and verifying 326 the requestor, the third party blockchain application 136 can request 328 approval from the off-blockchain target entity device 220 to respond to the confirmation entity. The third party blockchain application 136 can seek approval from the target entity through any secure mechanism. In the scenario 300, the third party blockchain application 136 can send a request to the off-blockchain target entity device 220 via, for example, the third-party application 226. The third-party application 226 can prompt the target entity for approval for the third party to respond to the request. The third-party application 226 can transmit 330 a reply to the third party blockchain application 136 approving the third party blockchain application 136 to proceed.

In response to receiving 330 approval from the target entity, the third party blockchain application 136 prepares a reply to the request by fetching 332 the requested information. For example, the third party blockchain application 136 may retrieve data from the third party database 138 to gather information for the reply. The third party blockchain application 138 can automatically retrieve any requested information, without requiring human actors to manually enter any data.

The third party blockchain application 138 can then process the request and prepare a reply. If the request asks the third party to verify a particular piece of information, the third party blockchain application 138 can compare the information in the request to information in the third party's records. For example, the third party blockchain application 138 can compare a hash of the information in the third party's records (e.g., in the third party database 138) to the hash of the information in the request. If the hashes match, the third party blockchain application 138 can determine that the third party's information matches with the confirmation entity's information. The reply can include a flag indicating that the third party blockchain application 136 verifies the information in the request as accurate, and/or can include the hash of the information in the third party's records so that the confirmation entity blockchain application 116 can also verify that the hashes are identical. If the request asks the third party to provide a particular piece of information, the third party blockchain application 138 can retrieve the information and include the information in the reply. More particularly, the third party blockchain application 138 may calculate a hash of the information and include the hash in the reply rather than the information itself.

After preparing a reply including any requested verifications and/or information, the third party blockchain application 136 encrypts 334 the reply using a cryptographic algorithm. Similar to event 308, the third party blockchain application 136 can encrypt the reply using the symmetric key that the third party blockchain application 136 previously decrypted. In other implementations, the third party blockchain application 136 can encrypt the reply using a public key of the confirmation entity blockchain application 116. The third party blockchain application 136 can then store 336 the encrypted reply in the public storage system 140. The third party blockchain application 136 may also calculate a hash of the encrypted reply using a cryptographic hash function. Similar to event 310, the third party blockchain application 136 in some implementations refrains from storing the encrypted reply in the public storage system 140, and can instead include the encrypted reply in the reply transaction that the third party blockchain application 136 generates below at event 338.

Next, the third party blockchain application 136 generates 338 a reply transaction (i.e., a transaction to submit to the blockchain 150 associated with the reply). Similar to the request transaction, the reply transaction may include an indication of a location of the encrypted reply (e.g., a location of the encrypted reply stored in the public storage system 140), the hash of the encrypted reply, and/or the blockchain address of the confirmation entity blockchain application 116. The third party blockchain application 136 may also include a mechanism by which to decrypt the encrypted reply. However, if the third party blockchain application 136 encrypted 334 the reply using the previously-retrieved symmetric key, or the public key of the confirmation entity blockchain application 116, then the third party blockchain may omit the decryption mechanism from the encrypted reply.

After signing 338 the reply transaction with a private key associated with the third party, the third party blockchain application 136 submits 340 the reply transaction to the smart contract 152. The smart contract 152 validates 342 the reply, similar to the validation 316. In response to validating 342 the reply transaction, the smart contract 152 generates 344 an event that notifies the confirmation entity blockchain application 116 of the existence of the new reply transaction addressed to the confirmation entity blockchain application 116. Accordingly, the confirmation entity blockchain application 116 detects 346 the event and retrieves the reply transaction from the blockchain 150.

The confirmation entity blockchain application 116 uses the information in the reply transaction to retrieve 348 the encrypted reply. Based on the reply transaction, the confirmation entity blockchain application 116 determines the location of the encrypted reply (e.g., the location in the public storage system 140, if the encrypted reply is not included in the reply transaction). The confirmation entity blockchain application 116 can also verify whether the reply transaction was signed by the private key of the third party blockchain application 136 by attempting to decrypt the signature using a public key of the third party blockchain application 136. Further, the confirmation entity blockchain application 116 can calculate a hash of the stored encrypted reply and compare the calculated hash to a hash included in the reply transaction to verify that the stored encrypted reply has not been altered.

Using an appropriate key (e.g., the symmetric key, or the private key of the confirmation entity blockchain application 116, depending on how the third party blockchain application 136 encrypted the reply), the confirmation entity blockchain application 116 can decrypt 350 the reply. The confirmation entity blockchain application 116 can then process the reply. For example, the confirmation entity blockchain application 116 can determine whether the third party verified information in the request and may display, via a display of the confirmation entity blockchain application 116, an indication of any verifications and/or an indication of information included in the reply. The confirmation entity blockchain application 116 may automatically determine that hashes in the reply conflicts with hashes in the request or hashes of information stored at the confirmation entity application device 110, and generate a notification to indicate the conflict.

Further, in some implementations, the confirmation entity blockchain application 116 and/or the third party blockchain application 136 may refrain from encrypting information in the request and reply, respectively. Such implementations may involve information that is not confidential or that the parties want to make available as-is to an outside, potentially anonymous entity, and that therefore can be stored publicly without encryption. For example, the third party may be willing to demonstrate to an outside entity that the third party provided information to the confirmation entity. As another example, an auditor may publish the auditor's certification of a financial statement of an audited company (i.e., the target). The third party can store a reply, for example the acceptance of the certification, in the public storage system 140, and provide a hash of the reply in the reply transaction submitted 340 to the smart contract 152. The outside entity can locate the request and the reply in the public storage system 140 based on a location indicated by the request and reply transactions, and can ensure that the original request, the certification, and the acceptance reply by the third party, have not been altered by comparing the request and reply to the hashes stored in the blockchain.

Figure 4A:
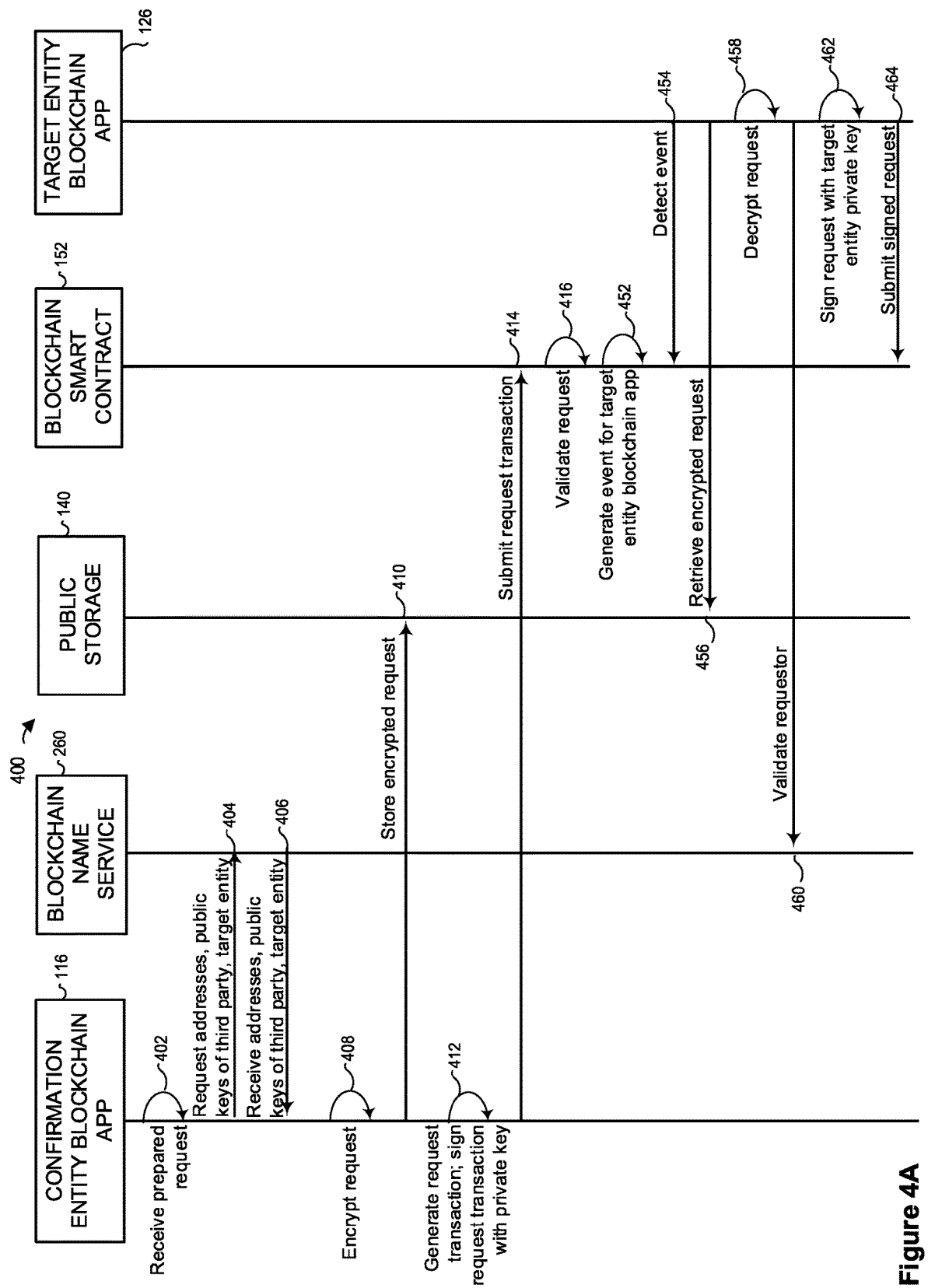
FIGS. 4A-4B are messaging diagrams of an example scenario similar to the scenario of FIGS. 3A-3B, but where the target entity accesses the blockchain.
Figure 4B:
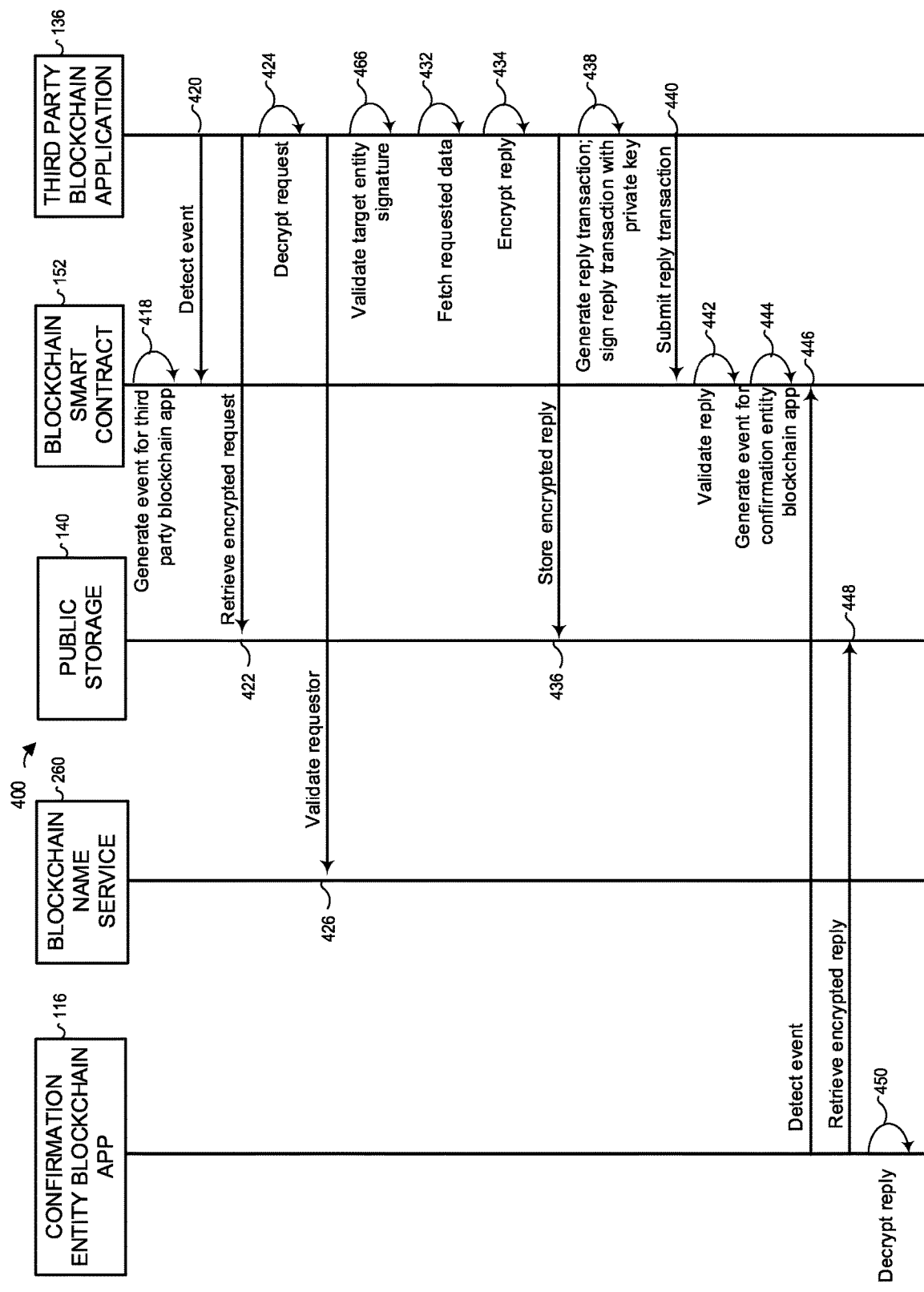

FIGS. 4A-4B illustrate an example scenario 400 similar to the scenario 300 of FIGS. 3A-3B, but where the target entity does access the blockchain 150. In particular, the sequence of events during the scenario 400 is generally similar to the scenario 300, but with the target entity providing direct approval for the request transaction via the blockchain rather than through the third party.

Events in FIGS. 4A-4B that are similar to those of FIGS. 3A-3B are labeled with similar reference numbers (e.g., event 302 is similar to event 402). With the exception of the differences shown in the figures and discussed below, any of the alternative implementations discussed with respect to a particular event in FIGS. 3A-3B may apply to events labeled with similar reference numbers in FIGS. 4A-4B, and vice versa.

Initially, the confirmation entity blockchain application 116 receives 402 a prepared request, similar to the event 302. The confirmation entity blockchain application 116 identifies both the third party and the target entity based on information in the request. The confirmation entity blockchain application 116 can then request 404 blockchain addresses and public keys of both the third party and the target entity, and receive 406 the requested addresses and keys. If the target entity is not associated with a blockchain address, then the flow can continue as in scenario 300 at 308.

The confirmation entity blockchain application 116 encrypts 408 the request using a cryptographic algorithm. In some implementations, the confirmation entity blockchain application 116 encrypts the request using a symmetric key. In other implementations, the confirmation entity 116 can encrypt the request using a public key of the third party blockchain application 136 and a public key of the target entity blockchain application 126. For example, the confirmation entity 116 can encrypt one copy of the request using a public key of the third party blockchain application 136, and another copy of the request using a public key of the target entity blockchain application 126, such that both the third party blockchain application and the target entity blockchain application 126 can later decrypt the request.

The confirmation entity blockchain application 116 can then store 410 the encrypted request in the public storage system 140 accessible by the third party blockchain application 136 and the target entity blockchain application 116. The confirmation entity blockchain application 116 may also calculate a hash of the encrypted request. Similarly to event 310, in some implementations the confirmation entity blockchain application 116 refrains from storing the encrypted request in the public storage system 150 and instead includes the encrypted request in the request transaction itself.

Next, the confirmation entity blockchain application 116 generates 412 a request transaction and signs the request transaction with a private key associated with the confirmation entity. The request transaction is generally similar to the request transaction generated at event 312. However, the request transaction includes the blockchain address of the target entity blockchain application 126 instead of or in addition to the blockchain address of the third party blockchain application 136. The inclusion of target entity blockchain application 126 address causes the smart contract 152 to generate an event for the target entity blockchain application 126 prior to notifying the third party blockchain application 136.

The confirmation entity blockchain application 116 submits 414 the request transaction to the smart contract 152, which validates 416 the request transaction. In response to validating 416 that request transaction, the smart contract 152 generates 452 an event that notifies the blockchain address of the target entity blockchain application 126. The event notifies the target entity blockchain application 126 of the existence of the new request transaction addressed to the target entity blockchain application 126. Accordingly, the target entity blockchain application 126 observes 454 the event and retrieves the request transaction from the blockchain 150.

The target entity blockchain application 126 uses the information in the request transaction to retrieve 456 the encrypted request. In particular, the target entity blockchain application 126 can determine the location of the encrypted request based on the request transaction. If the request transaction includes the symmetric key encrypted by the public key of the target entity blockchain application 126, the target entity blockchain application 126 decrypts the symmetric key using the private key of the target entity blockchain application 126. Further, the target entity blockchain application 126 can calculate a hash of the stored encrypted request and compare the calculated hash to a hash included in the request transaction to verify that the stored encrypted request has not been altered.

The target entity blockchain application 126 then decrypts 458 the encrypted request. In some embodiments, the target entity blockchain application 126 decrypts 458 the encrypted request using the symmetric key. In other embodiments, the target entity blockchain application 126 can decrypt 458 the encrypted request using the private key of the target entity blockchain application 126, depending on how the target entity blockchain application 116 encrypted the request.

Further, the target entity blockchain application 126 can verify 460 the originator of the request transaction. After retrieving the public key of the confirmation entity blockchain application 116 (e.g., from the blockchain name service 260), the target entity blockchain application 126 can decrypt the signature included in the request transaction to validate that the request transaction was signed with the private key of the confirmation entity blockchain 116.

After 458 the request and verifying 462 the requestor, the target entity blockchain application 126 can determine whether the target entity approves of the request. For example, the target entity blockchain application 126 can display, via a display of the target entity device 120, the request to a user of the target entity device 120. As another example, the target entity application 126 may be configured to automatically approve or deny the request based on the terms of the request. If the target entity approves of the request, the target entity blockchain application 126 signs 462 the request transaction and submits 464 the signed request transaction to the smart contract 152. The target entity blockchain application 126 may also include the blockchain address of the third party blockchain application 136 in the signed request transaction to indicate that the request transaction is directed to the third party blockchain application 136.

The smart contract 152 can validate the signed request transaction, including verifying that the target entity blockchain application 126 signed and transmitted the signed request transaction. Turning to FIG. 4B, in response to validating the request transaction, the smart contract generates 418 an event that notifies the blockchain address of the third party blockchain application 136, similar to event 318. Most of the remaining events in the scenario 400 may be generally similar to those in the scenario 300. However, the third party blockchain application 136 can verify the target entity's approval of the request by nature of the request transaction being signed by the private key of the target entity. The third party blockchain application 136 therefore does not need to request approval from the target entity.

Thus, the third party blockchain application 136 detects 420 the event, retrieves the request transaction from the blockchain 150, uses the information in the request transaction to retrieve 422 the encrypted request, and decrypts 424 the request, similar to the events 320, 322, and 324, respectively. In addition, the third party blockchain application 136 verifies 426 that the confirmation entity blockchain application 116 was the originator of the request transaction by verifying that the request transaction was signed by a private key of the confirmation entity blockchain application 116. The third party blockchain application 136 also verifies 466 that the target entity provided approval for the request transaction by validating that the request transaction was signed by a private key of the target entity blockchain application 126. In verifying 466 the signature of the target entity, the third party blockchain application 136 can retrieve the public key of the target entity from the blockchain name service 260 and can verify that the target entity is a valid client of the third party (i.e., that the third party indeed maintains information related to the target entity).

In response to verifying 466 approval by the target entity, the third party blockchain application 136 prepares a reply to the request by fetching 432 the requested information. The third party blockchain application 136 prepares the reply including any requested verifications and/or information (which may be in the form of hashes), and encrypts 434 the reply using a cryptographic algorithm (e.g., using the symmetric key or using a public key of the confirmation entity blockchain application 116). The third party blockchain application 136 stores 436 the encrypted reply in the public storage system 140 (or may include the encrypted reply in the reply transaction, as discussed above with reference to 336. The remaining events 438, 440, 442, 444, 446, 448. and 450 may be similar to the events 338, 340, 342, 344, 346, 348, and 350, respectively.

Figure 5:
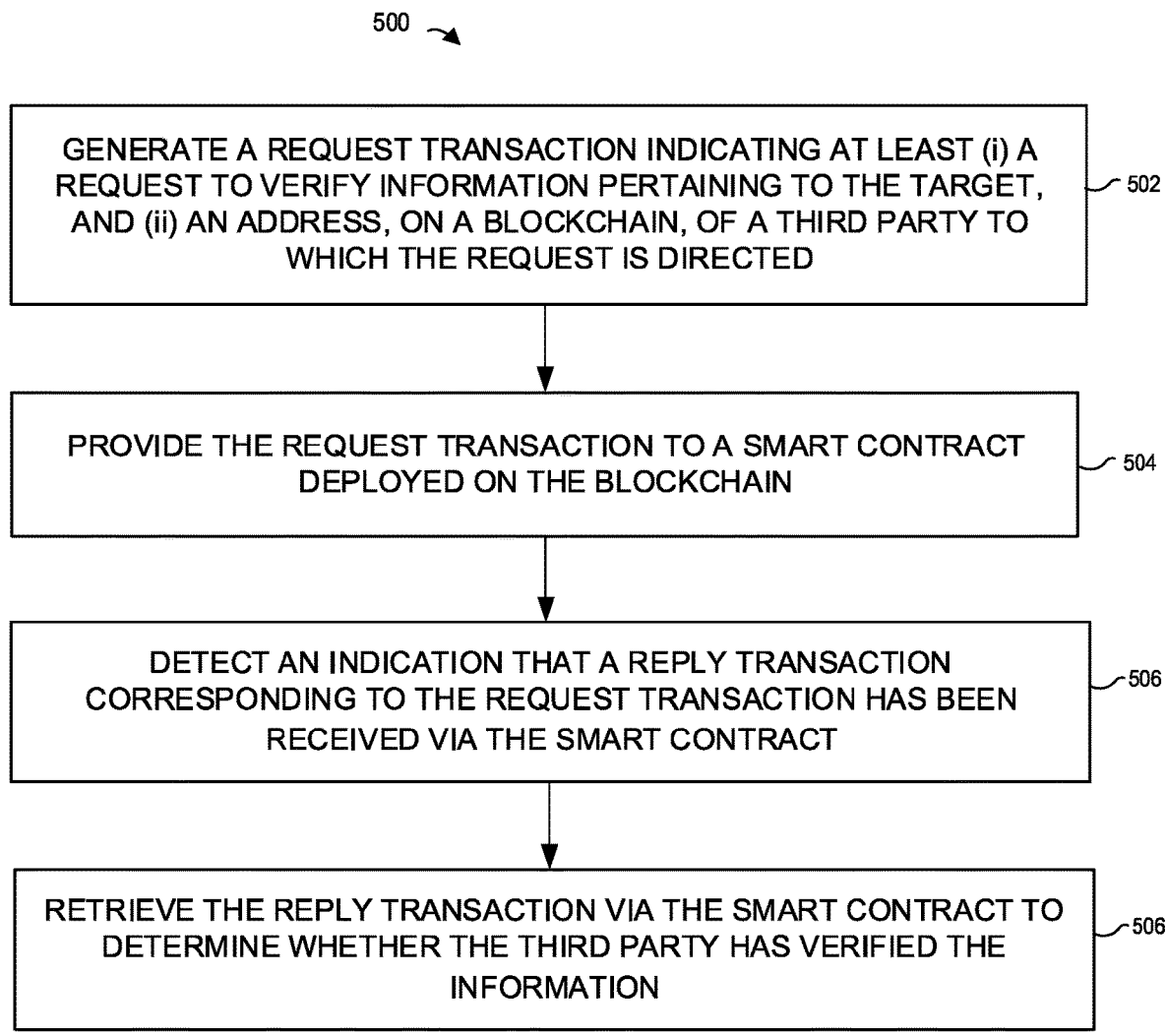
FIG. 5 is a flow diagram of an example method for processing a confirmation in accordance with the disclosed techniques, which can be implemented by one or more processors of a confirming entity device.

FIG. 5 illustrates an example method 500 for securely verifying information pertaining to a target, which can be implemented by one or more processors of a computing system (e.g., the processor(s) 112 of the confirmation entity device 110). For example, the method may be implemented as a set of instructions stored on a computer readable medium and executable by the one or more processors. In an example implementation, the computing system may be associated with an auditor, and the method may be for verifying information during an audit of the target.

At block 502, the computing system generates a request transaction indicating at least (i) a request to verify information pertaining to the target, and (ii) an address, on a blockchain (e.g., the blockchain 150), of a third party to which the request is directed (e.g., events 312 and 412). The request, for example, may be associated with a confirmation request for an audit or other investigation of the target, and the third party may be an institution that maintains information of the target. The blockchain address may be associated with an application of the third party (e.g., the third party blockchain application 136). Further, the computing system may calculate a hash value of at least a portion of the request (e.g., a portion of the request containing confidential information that the computing system aims to verify), and include the hash value in the request.

At block 504, the computing system provides the request transaction to a smart contract deployed on the blockchain (e.g., events 314 and 414). The computing system may sign the request transaction using a private key of a source of the transaction request (e.g., the confirmation entity). Prior to providing the request transaction to the smart contract, the computing system may encrypt the request and include the encrypted request in the request transaction or store the encrypted request in a location accessible by the third party (e.g., the public storage system 140). The computing system may encrypt the request using a symmetric encryption key, encrypt the symmetric encryption key using a public key of the third party, and include the symmetric encryption key in the request transaction. Alternatively, the computing system may encrypt the request using a public key of the third party.

In implementations in which the target accesses the blockchain, the computing system can include an address, on the blockchain, of the target (e.g., a blockchain address of the target entity blockchain application 126). The computing system can encrypt the symmetric encryption key using a public key associated with the target and include the encrypted symmetric encryption key in the request transaction, or can encrypt the request using a public key of the target.

At block 506, the computing system detects an indication that a reply transaction corresponding to the request transaction has been received via the smart contract (e.g., events 346 and 446). At block 508, the computing system retrieves the reply transaction via the smart contract to determine whether the third party has verified the information (e.g., events 348, 350, 448, and 450). The computing system can validate, using a public key associated with the third party, that the reply transaction was signed by the third party. To determine whether the third party has verified the information, the computing system may analyze flags included in the transaction request, and/or compare a hash value included in the reply transaction with a hash of information stored at the computing system.

Additional Considerations

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

For example, the network may include, but is not limited to, any combination of a LAN, a MAN, a WAN, a mobile, a wired or wireless network, a private network, or a virtual private network. Moreover, it is understood that any number of client computers or display devices are supported and may be in communication with the data system 104.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Accordingly, the term hardware should be understood to encompass a tangible entity, which may be one of an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of exemplary functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some exemplary embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors). These operations are accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computing system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for exchanging confidential information through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a computing system of supporting verification of information pertaining to a target, the method comprising:
   detecting, by one or more processors of the computing system, an indication that a request transaction has been received by a smart contract deployed on a blockchain, the request transaction indicating a request to verify information pertaining to the target;
   retrieving, by the one or more processors, the request based on the request transaction;
   generating, by the one or more processors, a reply transaction indicating at least (i) a reply to the request, and (ii) an address, on the blockchain, of an originator of the request; and
   providing, by the one or more processors, the reply transaction to the smart contract.

2. The method of claim 1, wherein the request corresponds to a confirmation request for an investigation of the target, and the originator is a user or an entity seeking to verify the information pertaining to the target.

3. The method of claim 1, further comprising:
   decrypting, by the one or more processors, the request after retrieving the request.

4. The method of claim 3, wherein decrypting the request includes using a symmetric encryption key.

5. The method of claim 4, wherein the symmetric encryption key is included in the request transaction, and wherein decrypting the request includes:
   prior to decrypting the request, decrypting the symmetric encryption key included in the request transaction using a private key.

6. The method of claim 1, further comprising:
   encrypting the reply prior to providing the reply transaction to the smart contract.

7. The method of claim 1, further comprising:
   validating, by the one or more processors, using a public key associated with the originator, that the request transaction was signed by the originator.

8. The method of claim 1, further comprising:
   requesting, by the one or more processors, from the target, approval to respond to the request transaction.

9. The method of claim 1, further comprising:
   verifying, by the one or more processors, using a public key associated with the target, that the target provided approval for the request transaction.

10. The method of claim 1, wherein generating the reply transaction includes:
    retrieving data pertaining to the target and related to the information;
    calculating a hash value of the data; and
    including the hash value in the reply.

11. A computing system for supporting verification of information pertaining to a target, the computing system comprising:
    one or more processors; and
    a non-transitory computer-readable medium storing thereon instructions that, when executed by the one or more processors, cause the computing system to:
       detect an indication that a request transaction has been received by a smart contract deployed on a blockchain, the request transaction indicating a request to verify information pertaining to the target;
       retrieve the request based on the request transaction;
       generate a reply transaction indicating at least (i) a reply to the request, and (ii) an address, on the blockchain, of an originator of the request; and
       provide the reply transaction to the smart contract.

12. The computing system of claim 11, wherein the request corresponds to a confirmation request for an investigation of the target, and the originator is a user or an entity seeking to verify the information pertaining to the target.

13. The computing system of claim 11, wherein the instructions further cause the computing system to:
    decrypt the request after retrieving the request.

14. The computing system of claim 13, wherein the instructions cause the computing system to decrypt the request using a symmetric encryption key.

15. The computing system of claim 14, wherein the symmetric encryption key is included in the request transaction, and wherein the instructions cause the computing system to decrypt the request by:

prior to decrypting the request, decrypting the symmetric key included in the request transaction using a private key.

16. The computing system of claim 11, wherein the instructions further cause the computing system to:

encrypt the reply prior to providing the reply transaction to the smart contract.

17. The computing system of claim 11, wherein the instructions further cause the computing system to:

validate, using a public key associated with the originator, that the request transaction was signed by the originator.

18. The computing system of claim 11, wherein the instructions further cause the computing system to:

request, from the target, approval to respond to the request transaction.

19. The computing system of claim 11, wherein the instructions further cause the computing system to:

verify, using a public key associated with the target, that the target provided approval for the request transaction.

20. The computing system of claim 11, wherein the instructions cause the computing system to generate the reply transaction by:

retrieving data pertaining to the target and related to the information;

calculating a hash value of the data; and including the hash value in the reply.

* * * * *